United States Patent
Choung et al.

(10) Patent No.: US 10,760,461 B2
(45) Date of Patent: Sep. 1, 2020

(54) CATALYST OXYGEN PURGE CONTROL APPARATUS AND METHOD

(71) Applicants: Hyundai Motor Company, Seoul (KR); Hyundai Kefico Corporation, Gunpo-si (KR); Kia Motors Corporation, Seoul (KR)

(72) Inventors: Jin Woo Choung, Suwon-si (KR); Chang Hwan Kim, Seongnam-si (KR); SungJae Kim, Gwacheon-si (KR); SooMin Lee, Seongnam-si (KR)

(73) Assignees: Hyundai Motor Company, Seoul (KR); Hyundai Kefico Corporation, Gunpo-si (KR); Kia Motors Corporation, Seoul (KR)

(*) Notice: Subject to any disclaimer, the term of this patent is extended or adjusted under 35 U.S.C. 154(b) by 36 days.

(21) Appl. No.: 16/566,619

(22) Filed: Sep. 10, 2019

(65) Prior Publication Data
US 2020/0018206 A1    Jan. 16, 2020

Related U.S. Application Data

(62) Division of application No. 15/371,021, filed on Dec. 6, 2016, now Pat. No. 10,443,464.

(30) Foreign Application Priority Data

Oct. 7, 2016 (KR) .......................... 10-2016-0129837

(51) Int. Cl.
*F01N 3/08* (2006.01)
*F01N 11/00* (2006.01)
(Continued)

(52) U.S. Cl.
CPC ......... *F01N 3/0864* (2013.01); *F01N 3/0871* (2013.01); *F01N 3/101* (2013.01);
(Continued)

(58) Field of Classification Search
CPC ..... F02D 2200/0814; F02D 2200/0816; F02D 41/123; F01N 2560/025; F01N 11/007;
(Continued)

(56) References Cited

U.S. PATENT DOCUMENTS 6,347,511 B1   2/2002  Haines
7,474,956 B2   1/2009  Nakagawa
(Continued)

FOREIGN PATENT DOCUMENTS

JP   2005-233115 A   9/2005
JP   2013-119809 A   6/2013

*Primary Examiner* — Anthony Ayala Delgado
(74) *Attorney, Agent, or Firm* — Morgan, Lewis & Bockius LLP

(57) ABSTRACT

A catalyst oxygen purge control method may include a catalyst oxygen purge control method during a cold engine period of a catalyst oxygen purge control apparatus which includes a three way catalytic converter through which an exhaust gas combusted when air and fuel are mixed in a combustion chamber is exhausted and the exhaust gas passes, wherein the method includes determining whether a fuel cut condition of an injector which injects the fuel to the combustion chamber is satisfied, performing fuel cut of the injector when the fuel cut condition is satisfied, measuring an oxygen storage capacity of the three way catalyst, and adjusting an oxygen purge time based on the measured oxygen storage capacity.

3 Claims, 8 Drawing Sheets

(51) Int. Cl.
*F01N 3/10* (2006.01)
*F01N 3/20* (2006.01)

(52) U.S. Cl.
CPC ............ *F01N 3/2033* (2013.01); *F01N 11/00* (2013.01); *F01N 2430/02* (2013.01); *F01N 2430/06* (2013.01); *F01N 2550/02* (2013.01); *F01N 2550/03* (2013.01); *F01N 2560/025* (2013.01); *F01N 2900/1624* (2013.01); *Y02A 50/2324* (2018.01); *Y02T 10/22* (2013.01); *Y02T 10/47* (2013.01)

(58) Field of Classification Search
CPC ............ F01N 3/101; F01N 2900/1624; F01N 3/0871; Y02T 10/22
See application file for complete search history.

(56) References Cited

U.S. PATENT DOCUMENTS

| | | |
|---|---|---|
| 9,261,007 B2 | 2/2016 | Aoki |
| 9,512,765 B2 | 12/2016 | Horst |
| 9,599,055 B2 | 3/2017 | Kitaura |
| 9,605,616 B2 | 3/2017 | Suzuki |
| 9,835,104 B2 | 12/2017 | Okazaki |
| 2008/0120965 A1 | 5/2008 | Morita |
| 2008/0131346 A1 | 6/2008 | Morita |
| 2017/0175656 A1 | 6/2017 | Masubuchi |

CATALYST OXYGEN PURGE CONTROL APPARATUS AND METHOD

CROSS-REFERENCE TO RELATED APPLICATION

The present application is a Divisional of U.S. patent application Ser. No. 15/371,021, filed Dec. 6, 2016, which claims priority to Korean Patent Application No. 10-2016-0129837 filed on Oct. 7, 2016, the entire contents of which applications are incorporated herein for all purposes by these references.

BACKGROUND OF THE INVENTION

Field of the Invention

Various embodiments of the present invention relates to a catalyst oxygen purge control apparatus and method, and more particularly, to an apparatus and a method for adjusting an oxygen purge time after fuel-cut according to a degradation level of a three way catalyst.

Description of Related Art

Recently, according to increased usage of vehicles and increased traffic volume, air pollution due to exhaust gas comes to the fore as a serious social problem.

Therefore, government of every country sets an emission standard of pollutant in exhaust gas such as carbon monoxide (CO), hydrocarbon (HC), nitrogen oxide (NOx) and the like in order to regulate exhaust gas. Regulations on the exhaust gas are becoming stricter more and more.

Further, manufacturers of vehicles make a great effort to effectively cope with the regulations on the exhaust gas which is becoming stricter. A novel vehicle is manufactured in accordance with an exhaust gas emission standard.

Particularly, in order to satisfy an exhaust gas emission standard, a three way catalyst converter in which a noble metal is immersed is mounted in an exhaust system of the vehicle to accelerate decomposition of hydrocarbon, oxidation of carbon monoxide, and reduction of nitrogen oxide.

The three way catalyst refers to a catalyst which simultaneously reacts with a hydrocarbon based compound, carbon monoxide, and nitrogen oxide (NOx) to remove these compounds and a Pt/Rh, Pd/Rh or Pt/Pd/Rh catalyst is mainly used.

The three way catalyst performs a function of reducing carbon monoxide and hydrocarbon or reducing nitrogen oxide in response to change of a lean (excessive oxygen) state and a rich (excessive fuel) state with respect to an air/fuel ratio of exhaust gas.

In the meantime, in a fuel cut state, unburned air passes through the three way catalyst so that oxygen is stored in the three way catalyst. When fuel is reinjected, a purification rate of nitrogen oxide is significantly lowered due to the stored oxygen. In order to prevent the lowering of purification rate, an oxygen purge ($O_2$ purge) function which excessively injects the fuel at the time of respraying the fuel to consume oxygen is performed.

In the case of a novel three way catalyst, the same oxygen purge method is applied to fuel cut and oxygen purge regardless of before/after catalyst activation. Since the catalyst is not activated during the cold engine period, when oxygen is purged based on activation of catalyst, excessive hydrocarbon and carbon monoxide are emitted, so that exhaust gas purification effect is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a catalyst oxygen purge control apparatus and method which adjusts an oxygen purge time after a fuel-cut during the cold engine period according to a degradation level of a three way catalyst to improve actual fuel efficiency of a vehicle.

Various aspects of the present invention are directed to providing a catalyst oxygen purge control apparatus including an exhaust system which exhausts an exhaust gas generated in an engine, a three way catalytic converter (TWC) which supplies a catalyst to the exhaust system, an oxygen sensor which detects an oxygen storage capacity (OSC) of the three way catalytic converter, a determining device which quantitatively determines a degradation level of a catalyst using the oxygen storage capacity to determine a change control condition which changes an oxygen purge time of the three way catalyst, and an oxygen purge controller which controls the catalytic converter according to the change control condition to control the oxygen purge time.

The oxygen purge time may be controlled before activating the three way catalyst during a cold engine period.

The change control condition may be at least one of an engine ignition timing, an idle revolution per minute (RPM), a CAM timing, an air/fuel ratio, and an injecting condition.

Various aspects of the present invention are directed to providing a catalyst oxygen purge control method during a cold engine period of a catalyst oxygen purge control apparatus which includes a three way catalytic converter through which an exhaust gas combusted when air and fuel are mixed in a combustion chamber is exhausted and the exhaust gas passes, the method including determining whether a fuel cut condition of an injector which injects the fuel to the combustion chamber is satisfied, performing fuel cut of the injector when the fuel cut condition is satisfied, measuring an oxygen storage capacity of the three way catalyst, and adjusting an oxygen purge time based on the measured oxygen storage capacity.

One criteria of the cold engine during the cold engine period may be that an exhaust gas temperature at a front end portion of the three way catalytic converter is lower than approximately 400 degrees and a time is before activation of the three way catalyst.

A criteria of the cold engine during the cold engine period may be before approximately 200 seconds after starting the engine, and be before the activation of the three way catalyst.

The oxygen purge time may be determined by the oxygen storage capacity of the three way catalyst.

As the oxygen storage capacity is small, the oxygen purge time may be increased.

The oxygen storage capacity may be measured using a chemical adsorption method, a simulation activation evaluation device, an engine, or a vehicle.

The oxygen storage capacity may be determined in accordance with a degradation level of the three way catalyst.

As the degradation level of the three way catalyst is increased, the oxygen storage capacity may be reduced.

The oxygen storage capacity may be linearly inversely proportional to the degradation level of the three way catalyst.

According to an exemplary embodiment of the present invention, a catalyst oxygen storage characteristic during the cold engine period is reflected to adjust an oxygen purge time, to minimize generation of exhaust gas. Further, an oxygen purge time during the cold engine period is shortened during the cold engine period to further improve fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
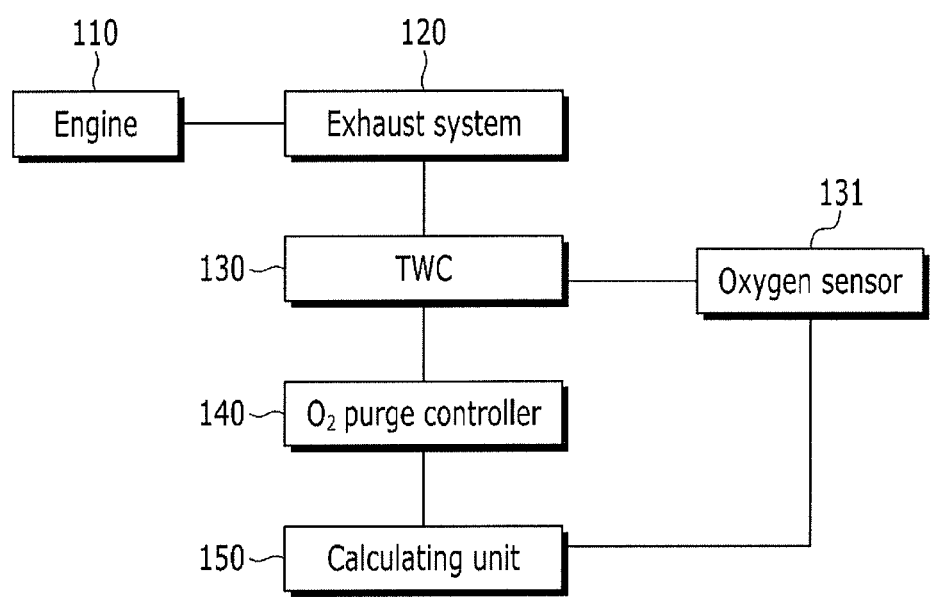
FIG. 1 is a schematic block diagram of a catalyst oxygen purge control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, in exemplary embodiments, since like reference numerals designate like elements having the same configuration, a one exemplary embodiment is representatively described, and in other exemplary embodiments, only a configuration different from one exemplary embodiment will be described.

It is noted that the drawings are schematic and are not dimensionally illustrated. A relative size and a ratio of parts in the drawings may be exaggerated or reduced for clarity and convenience in the drawings and an arbitrary size is just illustrative but is not restrictive. In addition, the same reference numerals designate the same structures, elements, or parts illustrated in the two or more drawings to exhibit similar characteristics. It will be understood that when an element is referred to as being "on" or "over" another element, it can be directly on the other element or intervening elements may also be present.

An exemplary embodiment of the present invention indicates an exemplary embodiment of the present invention. As a result, various modifications of the drawings are expected. Accordingly, the exemplary embodiment is not limited to a specific form of the illustrated region, and for example, includes a modification of a form by manufacturing.

Hereinafter, a catalyst oxygen purge control apparatus according to an exemplary embodiment of the present invention will be described with reference to FIG. 1.

FIG. 1 is a schematic block diagram of a catalyst oxygen purge control apparatus according to an exemplary embodiment of the present invention.

Referring to FIG. 1, a catalyst oxygen purge control apparatus includes an exhaust system 120, a three way catalytic converter (TWC) 130, an oxygen sensor 131, a determining device 150, and an oxygen purge controller 140.

The exhaust system 120 emits exhaust gas generated in an engine 110 and the three way catalytic converter 130 supplies a catalyst to the exhaust system 120. The three way catalytic converter 130 includes an oxygen sensor 131 which detects an oxygen storage capacity of the three way catalytic converter 130.

Examples of the engine 110 include a continuous variable valve timing (CVVT) engine, a double overhead camshaft (DOHC) engine, a continuous valve timing (CVT) engine, a gasoline direct injection (GDI) engine, and a multipoint injection (MPI) engine using gasoline as a fuel. In addition to the above-mentioned gasoline engine, an exemplary embodiment of the present invention may be applied to an engine using diesel as fuel and an engine using gas as a fuel.

The exhaust system 120 may be configured by an exhaust muffler which emits an exhaust gas generated in the engine, but also may be configured by a manifold or a catalyst converter.

The three way catalytic converter 130 includes a catalyst which performs oxygen and reduction reaction with the exhaust gas and a heater which heats the catalyst.

The oxygen sensor 132 detects an oxygen storage capacity of the three way catalytic converter 130 to provide the detected oxygen storage capacity information to the determining device 150.

The determining device 150 quantitatively determines a degradation level of the catalyst using the oxygen storage capacity to determine a change control condition to change an oxygen purge time of the three way catalyst.

As a mileage is increased, a performance of the catalyst is gradually deteriorated, which is referred to as catalyst degradation. The catalyst degradation may be generated by chemical inactivation or thermal inactivation. A major cause of degradation of a gasoline catalyst is thermal degradation due to exposure to a high temperature. The degradation results in increase of activation temperature (LOT, Light-Off Temperature) and reduction of conversion efficiency.

The oxygen purge controller 140 controls the catalytic converter 130 in accordance with the change control condition to control the oxygen purge time. The oxygen purge time may be controlled before activating the three way catalyst during the cold engine period and the change control condition may be at least one of an engine ignition timing, an idle revolution per minute (RPM), a CAM timing, an air/fuel ratio, and an injecting condition. Among these, a most influential condition is the engine ignition timing and the air/fuel ratio.

Figure 2:
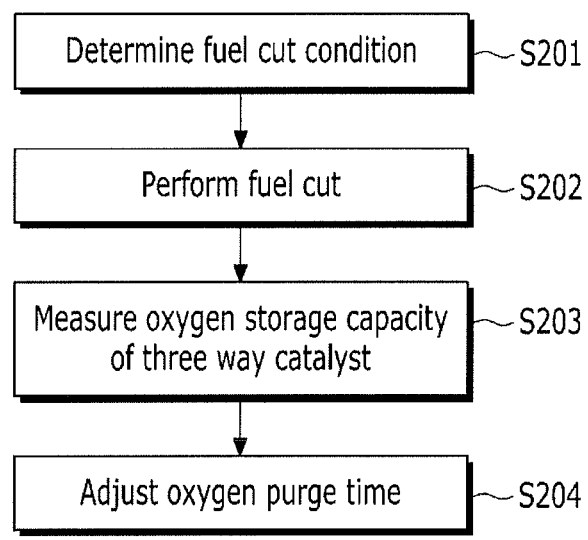
FIG. 2 is a flowchart illustrating a catalyst oxygen purge control method according to an exemplary embodiment of the present invention.

FIG. 2 is a flowchart illustrating a catalyst oxygen purge control method according to an exemplary embodiment of the present invention.

Referring to FIG. 2, a catalyst oxygen purge control method according to an exemplary embodiment of the present invention is a catalyst oxygen purge control method during the cold engine period of a catalyst oxygen purge control apparatus which includes a three way catalytic converter through which an exhaust gas combusted when air and fuel are mixed in a combustion chamber is exhausted and the exhaust gas passes. First, it is determined whether a fuel cut condition of an injector which injects the fuel to the combustion chamber is satisfied in step S201.

Next, when the fuel cut condition is satisfied, the fuel cut of the injector is performed in step S202.

Next, an oxygen storage capacity of the three way catalyst is measured in step S203. The oxygen storage capacity may be measured using a chemical adsorption method, a simulation activation evaluation device, an engine, or a vehicle. Further, the oxygen storage capacity may be determined in accordance with a degradation level of the three way catalyst. As the degradation level of the three way catalyst is increased, the oxygen storage capacity is reduced. Further, the oxygen storage capacity may be linearly inversely proportional to the degradation level of the three way catalyst.

Next, an oxygen purge time is adjusted based on the measured oxygen storage capacity in step S204.

In the instant case, a criterion of the cold engine during the cold engine period is that an exhaust gas temperature at a front end portion of the three way catalytic converter is lower than approximately 400 degrees and a time is before activation of the three way catalyst. Further, the time may be before approximately 200 seconds after starting the engine, and may be before the activation of the three way catalyst.

Further, the oxygen purge time may be determined by the oxygen storage capacity of the three way catalyst. The smaller the oxygen storage capacity is, the longer the oxygen purge time is.

In the meantime, the oxygen storage capacity may be measured after a fuel cut in the oxygen purge time adjusting step S204 and then may be changed. However, there may be a deviation of a measurement value. Therefore, an oxygen storage capacity which is measured in a predetermined condition during general operation to be updated may be used.

Further, the oxygen storage capacity may be measured in the fuel cut step S202 or under a fixed speed condition.

Figure 3:
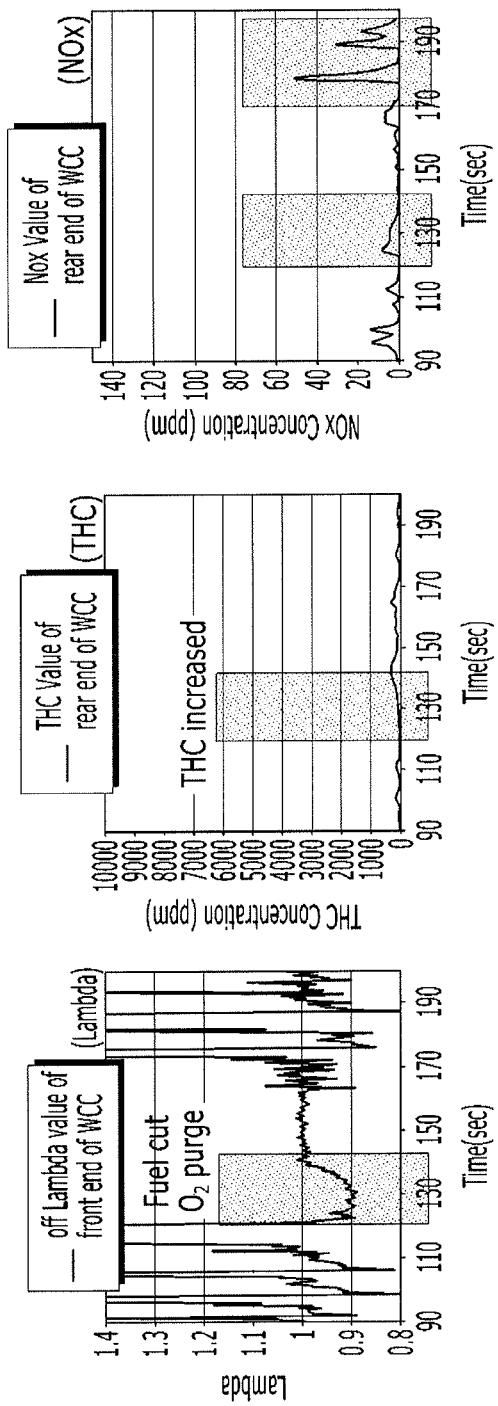
FIG. 3 is a graph illustrating an EM exhaust behavior when a catalyst oxygen purge of a 4 Kmile degraded product is performed during the cold engine period according to an exemplary embodiment of the present invention.
Figure 4:
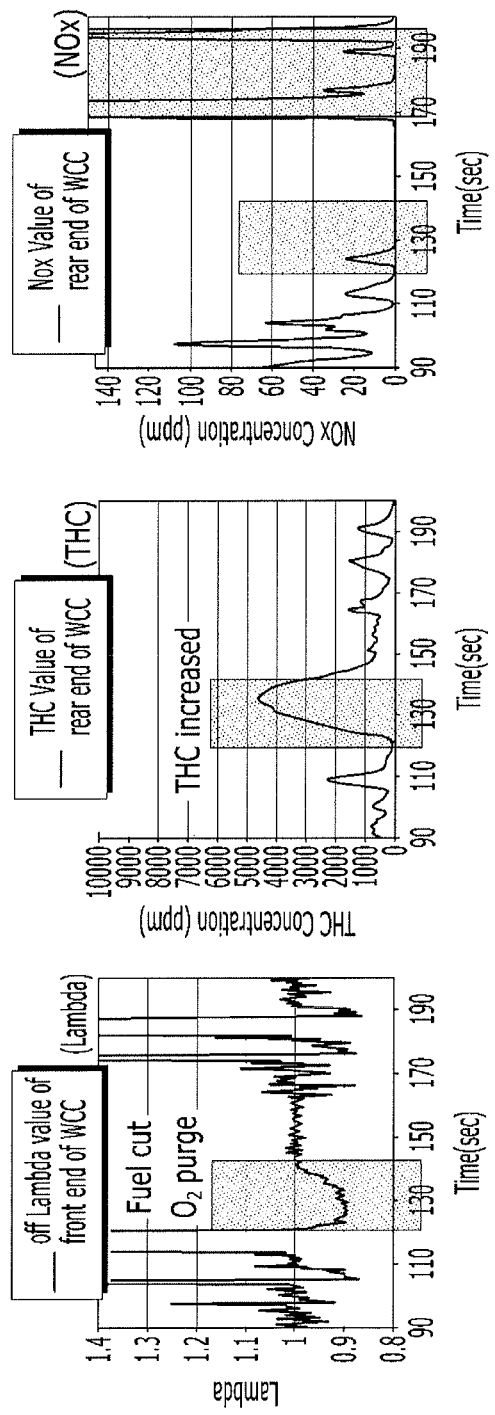
FIG. 4 is a graph illustrating an EM exhaust behavior when a catalyst oxygen purge of a 150 Kmile degraded product is performed during the cold engine period according to an exemplary embodiment of the present invention.

FIG. 3 is a graph illustrating an EM exhaust behavior when a catalyst oxygen purge of a 4 Kmile degraded product is performed during the cold engine period according to an exemplary embodiment of the present invention and FIG. 4 is a graph illustrating an EM exhaust behavior when a catalyst oxygen purge of a 150 Kmile degraded product is performed during the cold engine period according to an exemplary embodiment of the present invention.

Referring to FIG. 3, during the cold engine period when a three way catalyst exhaust temperature is approximately 400 degrees or lower before approximately 200 seconds after starting the engine, a lambda value of a front end portion of the three way catalytic converter of the 4 Kmile degraded product, that is, an air/fuel ratio is lowered at the time of oxygen purge. An amount of exhausted hydrocarbon and nitrogen oxide which is measured at an exit WCC of the three way catalytic converter is small. Further, referring to FIG. 4, during the cold engine period when a three way catalyst exhaust temperature is approximately 400 degrees or lower before approximately 200 seconds after starting the engine, in the 150 Kmile degraded product, an emission amount of exhausted hydrocarbon and nitrogen oxide is increased at the time of oxygen purge.

As illustrated in FIG. 3 and FIG. 4, in the case of the 4 Kmile degraded product which is a new product, an EM exhaust characteristic during the cold engine period is low. Further, in the case of a new product, the oxygen purge time is shortened, so that the fuel efficiency may be further improved.

Figure 5:
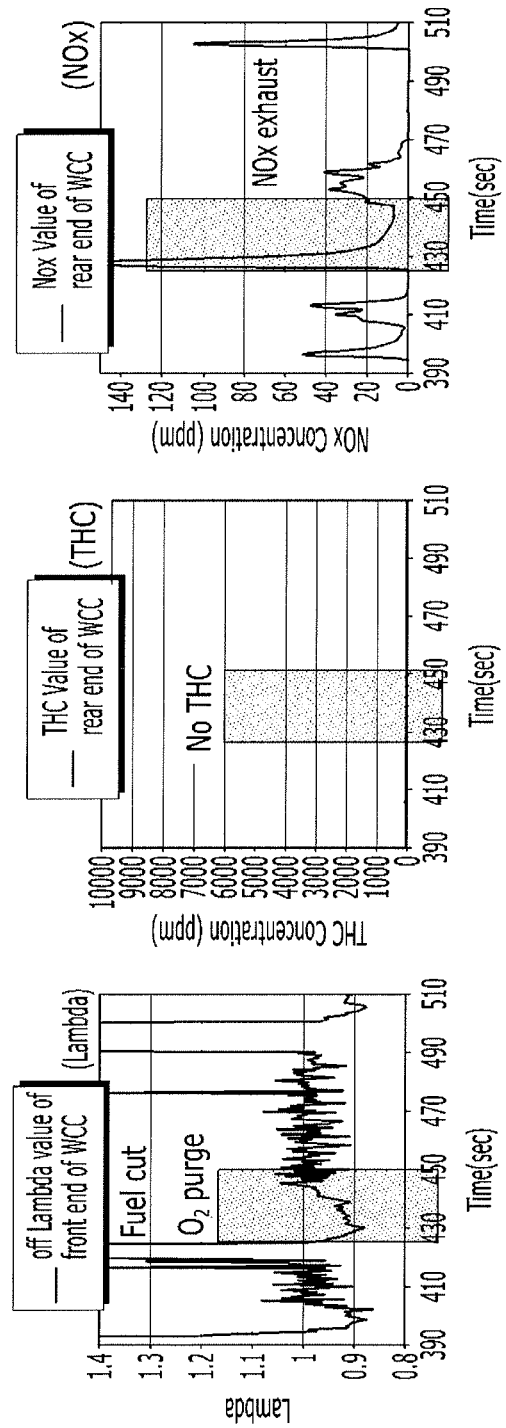
FIG. 5 is a graph illustrating an EM exhaust behavior when a catalyst oxygen purge of a 4 Kmile degraded product is performed during the warm engine period according to an exemplary embodiment of the present invention.
Figure 6:
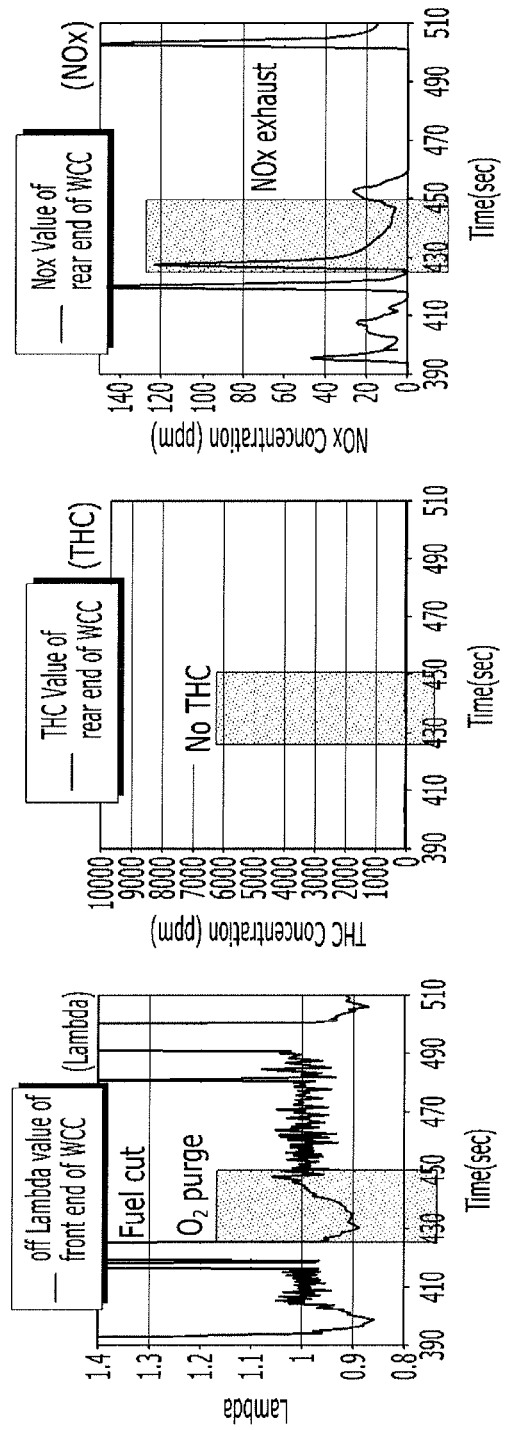
FIG. 6 is a graph illustrating an EM exhaust behavior when a catalyst oxygen purge of a 150 Kmile degraded product is performed during the warm engine period according to an exemplary embodiment of the present invention.

FIG. 5 is a graph illustrating an EM exhaust behavior when a catalyst oxygen purge of a 4 Kmile degraded product is performed during the warm engine period according to an exemplary embodiment of the present invention and FIG. 6 is a graph illustrating an EM exhaust behavior when a catalyst oxygen purge of a 150 Kmile degraded product is performed during the warm engine period according to an exemplary embodiment of the present invention.

Referring to FIG. 5 and FIG. 6, during the warm engine period when a three way catalyst exhaust temperature is approximately 400 degrees or higher after approximately 200 seconds after starting the engine, hydrocarbon is not exhausted but a large amount of nitrogen oxide is exhausted. As illustrated in FIG. 5 and FIG. 6, during the warm engine period, since it is observed that the 4 Kmile degraded product and the 150 Kmile degraded product exhaust a similar amount of nitrogen oxide, it is difficult to shorten oxygen purge time.

Figure 7:
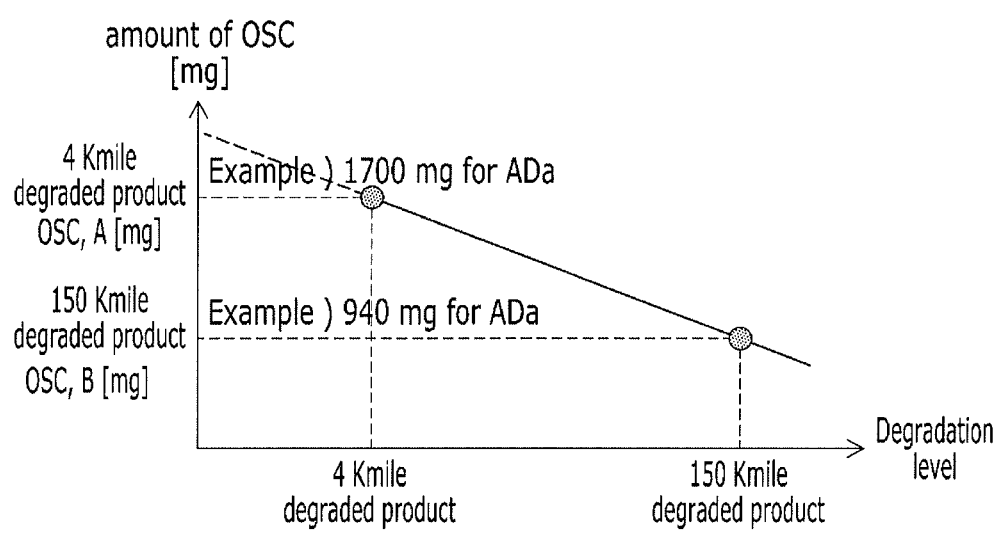
FIG. 7 is a graph illustrating an oxygen storage capacity of a catalyst according to a catalyst degradation level according to an exemplary embodiment of the present invention.

FIG. 7 is a graph illustrating an oxygen storage capacity of a catalyst according to a catalyst degradation level according to an exemplary embodiment of the present invention.

Referring to FIG. 7, it is understood that as compared with the 4 Kmile degraded product, an oxygen storage capacity of the 150 Kmile degraded product is small. For example, in the case of a gasoline vehicle with 1.4 liter engine, it is understood that an oxygen storage capacity of a three-way catalyst of a 4 Kmile degraded product is approximately 1700 mg and an oxygen storage capacity of a three-way catalyst of a 150 Kmile degraded product is approximately 940 mg. The oxygen storage capacity is linearly inversely proportional to a degradation level of the three way catalyst.

Figure 8:
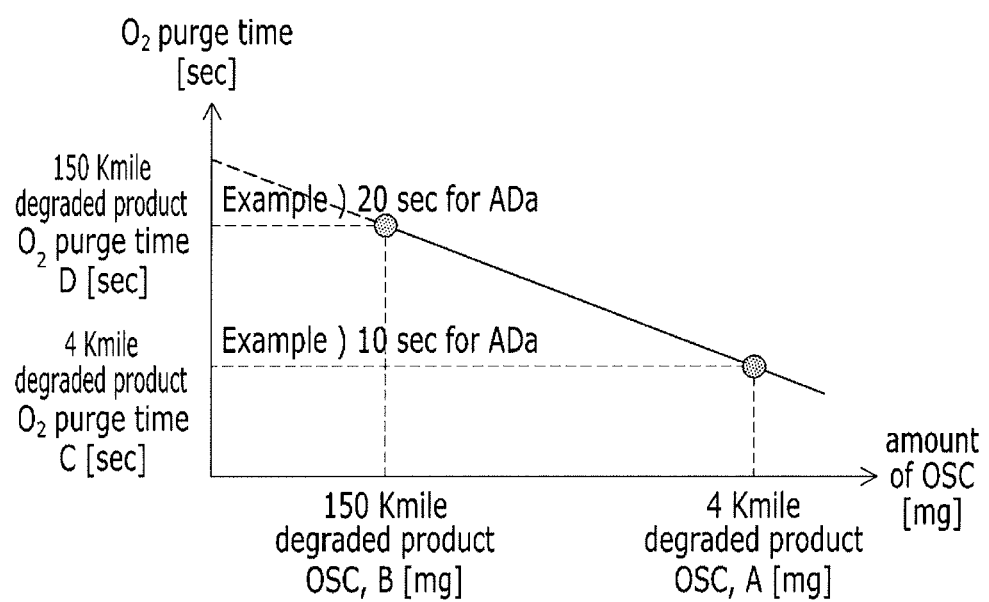
FIG. 8 is a graph illustrating an oxygen purge time according to an oxygen storage capacity of a catalyst according to an exemplary embodiment of the present invention.

FIG. 8 is a graph illustrating an oxygen purge time according to an oxygen storage capacity of a catalyst according to an exemplary embodiment of the present invention.

Referring to FIG. 8, as compared with the 4 Kmile degraded product, the oxygen purge time of the 150 Kmile degraded product is increased. That is, as the oxygen storage capacity is reduced, the oxygen purge time is increased after the fuel cut. In the instant case, the oxygen storage capacity is linearly inversely proportional to the oxygen purge time. For example, in the case of a gasoline vehicle with 1.4 liter engine, an oxygen purge time of a three-way catalyst of a 4 Kmile degraded product is adjusted to approximately 10 seconds and an oxygen purge time of a three-way catalyst of a 150 Kmile degraded product is adjusted to approximately 20 seconds.

As described above, according to the exemplary embodiment of the present invention, the catalyst oxygen storage characteristic during the cold engine period is reflected to adjust the oxygen purge time, minimizing the exhaust gas.

Further, the oxygen purge time is shortened during the cold engine period, further improving fuel efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A catalyst oxygen purge control apparatus, comprising:
   an exhaust system which exhausts an exhaust gas generated in an engine;
   a three way catalytic converter (TWC) which supplies a catalyst to the exhaust system;
   an oxygen sensor which detects an oxygen storage capacity (OSC) of the three way catalytic converter; and
   an electric control unit which is configured to quantitatively determine a degradation level of the catalyst using the oxygen storage capacity to determine a change control condition which changes an oxygen purge time of the three way catalyst, and controls the catalytic converter according to the change control condition to control the oxygen purge time,
   wherein the oxygen purge time is determined by the oxygen storage capacity of the three way catalyst, and as the oxygen storage capacity is reduced, the oxygen purge time is configured to be increased, and
   wherein the oxygen storage capacity is determined in accordance with a degradation level of the three way catalyst, and as the degradation level of the three way catalyst is increased, the oxygen storage capacity is configured to be reduced.

2. The catalyst oxygen purge control apparatus of claim 1, wherein the oxygen purge time is configured to be controlled before activating the three way catalyst during a cold engine period.

3. The catalyst oxygen purge control apparatus of claim 1, wherein the change control condition is at least one of an engine ignition timing, an idle revolution per minute (RPM), a CAM timing, an air/fuel ratio, and an injecting condition.

* * * * *